Patented Aug. 15, 1933

1,922,143

UNITED STATES PATENT OFFICE 1,922,143

METHOD FOR EGG PRESERVATION

Paul F. Sharp, Ithaca, N. Y., assignor to Cornell University, Ithaca, N. Y., a Corporation of New York No Drawing. Application July 11, 1928
Serial No. 292,029

5 Claims. (Cl. 99—11)

This invention has for its object the provision of improvements in egg preservation and in broad aspects the invention is directed to improvements in novel methods and apparatus in egg preservation whereby preservation of eggs can be effected not only in a cheaper manner than heretofore, but whereby preservation can be effected for longer periods than are now obtainable. Notwithstanding the fact that the eggs can be preserved for longer periods, the quality of the eggs is very much improved over that obtainable with present methods.

It has been found that the white of an egg increases in alkalinity soon after it is laid. The deterioration of the egg after it is laid is due mainly to the decomposition by this alkaline reaction.

The present invention contemplates the provision of a cheap way of neutralizing this alkalinity condition and restoring or maintaining the egg at approximately the same alkalinity condition that it had when laid. In biological chemistry the symbol pH is used for expressing in numerical terms the intensity of acidity or alkalinity. By mixing an alkaline solution and an acid solution in various proportions, a solution can be obtained which would have various degrees of acidity or alkalinity varying from very strongly acid through neutrality to a very strongly alkaline condition. Thus the reaction of possible mixtures of acids and alkali can be expressed as one series or one set of units and such units are called pH. For example, a solution having a pH of 7.0 is neutral, that is, the acidity is equal to the alkalinity. A solution of pH 6.9 is slightly acid. A solution of pH 7.1 is slightly alkaline.

It has been found that the pH of the egg white of a fresh egg less than one hour old, is about 7.6, but that ordinarily as soon as the egg is laid, carbon dioxide begins to leave the egg in the form of a gas and the pH begins to increase (that is the alkalinity begins to increase) until under some conditions it may reach a value as high as pH 9.7 or even higher. Inasmuch as a solution of pH 9.0 is a hundred times more alkaline so far as hydroxyl-ion concentration is concerned than a solution of pH 7.0 the alkalinity of an egg with a pH 9.7 may have increased as much or over one hundred times that of a freshly laid egg. It is this relatively high alkalinity which causes a decomposition of the proteins of the white of an egg. It accelerates the tendency of the jelly-like white which surrounds the yolk of the egg to become more fluid, that is, it hastens the formation of one of the great objectionable features of stored eggs known as "watery whites".

Eggs in storage also change with respect to the condition of the yolk. The tendency of the yolk of an egg to flatten and break when the egg is broken will increase with the time interval of storage. It seems also that this tendency of the yolk membrane to progressively weaken and of the yolk to flatten is accentuated with relatively high pH conditions. Accordingly, by hindering the attainment of progressively higher pH conditions or by lowering the pH conditions the tendency of the yolks to flatten or break is greatly decreased. Eggs in which the yolks break are usually rejected by the consumer as "spoiled".

The high pH (high alkalinity of the white) causes eggs to deteriorate in storage in one other respect. During storage or as soon as an egg is laid, water begins to pass from the white to the yolk, thus making the contents of the yolk more liquid and watery. Such passage of water from the white to the yolk is greatly retarded by low temperatures and a further retarding influence seems to be correlated to a low pH of the white.

Summarizing the high pH (high alkalinity) tends to accelerate at least three factors which are accountable for the deterioration of eggs in storage.

(1) The breaking down of the jelly-like white of the egg to a watery fluid.

(2) The changing of the yolk structure which causes the yolk to break more readily.

(3) The passing of water from the white into the yolk.

Carbon dioxide when dissolved in a watery liquid forms an acid, carbonic acid. If more carbon dioxide is added to the liquid, this in effect is the same as adding more acid and use can be made of such carbon dioxide for neutralizing conditions of alkalinity.

The alkalinity of the egg white while in the hen's body, is kept low at about pH 7.6 by the carbon dioxide in the hen's blood and tissues, but as soon as the egg is laid, it begins to loose carbon dioxide to the surrounding air and the egg begins to increase in alkalinity. In order to keep the egg in more nearly its freshly laid condition, all that is necessary is to place the egg in an atmosphere containing a concentration of carbon dioxide equivalent to the concentration of carbon dioxide which the tissues of the hen's body supply to the egg, that is, the egg should be placed in an atmosphere containing about ten to twelve percent carbon dioxide for ordinary room temperatures. Such a concentration of carbon dioxide in the atmosphere at room temperatures, i. e., about 75° F. will serve to keep the pH of the white at about 7.6. Furthermore, if the pH of the egg white has reached a higher value due to the egg remaining in normal air for a time before being placed in the atmosphere containing carbon dioxide, such ten to twelve percent concentration of $CO_2$ in the atmosphere will bring the pH of the egg back to 7.6. Higher concentrations than above given may be used in the event that the eggs have attained relatively high pH conditions of the white and if it is desired to more rapidly initially decrease the alkalinity condition. Generally it may be stated that excessive concentrations of carbon dioxide should be avoided on account of the initial cost of the carbon dioxide and because if too great concentration were employed there would be a tendency to lower the pH to an excessively low point relative to that of a freshly laid egg. Such excessively low pH conditions are undesirable because they greatly increase the milkiness or turbidity of the white which requires dissipation before the eggs are marketed.

Carbon dioxide is more soluble the lower the temperature so that to hold the pH of eggs at 7.6 at a high temperature requires more carbon dioxide in the atmosphere in which the eggs are kept than it does at a low temperature. For example, at about 37° F. approximately 3% of carbon dioxide in the atmosphere is all that is required to hold the pH at 7.6 at that temperature, that is, about 3% of $CO_2$ at 37° F. will do what would require about ten to twelve percent at $CO_2$ at 75° F.

The improvement in quality obtained by carrying out this method is most marked. For example, by utilizing this method an egg kept six months at 30° F. (cold storage temperature for eggs) at near pH 7.6, will have about the same quality as an egg kept one or two months under ordinary storage conditions or an egg kept about one week at room temperature, assuming that eggs are placed in storage soon after they were laid. The introduction of the carbon dioxide into the atmosphere in which eggs are kept markedly retards the deteriorative changes at any temperature to which the eggs are normally subjected. The "standing up" quality of the yolk is improved. Less water passes from the white into the yolk and less change of the jelly-like white to watery white condition takes place. In the carrying out of the present invention, the proportions of $CO_2$ which are to be used, will vary largely according to the storage conditions. For example, in a storage warehouse, where workmen must from time to time pass into the warehouse, it may not be practicable to increase the carbon dioxide content in the atmosphere to the extent above indicated, because of liability of injurious effects upon workers. Under these conditions, even if the atmosphere in the storage room had its carbon dioxide content raised to about 1%, the eggs would keep much better probably twice to three times as well as they would without the use of carbon dioxide at all. Even higher concentrations of $CO_2$ could be used probably up to about 3% or slightly under, or up to a concentration in which workmen could work without injurious effects.

According to the present invention, storage warehouses for eggs should be provided with means for introducing additional quantities of carbon dioxide into the storage atmosphere. Suitable means should be provided for effecting the distribution of the carbon dioxide such as by circulating fans or the like. Carbon dioxide likewise can be utilized in refrigerating cars with greatly beneficial results. Egg containers can be provided in which the desired concentration of carbon dioxide can be maintained to preserve the eggs.

One method which is now used for preserving eggs comprising dipping of the eggs in an oil which will form a coating on them which very nearly seals the egg. While such method does not prevent wholly the escape of carbon dioxide, it does cause its escape to be markedly much slower. However, with such method certain objectionable features have been discovered, viz. if the eggs are dipped after the pH condition is raised due to the escape of $CO_2$ from the egg the full preserving effect is not secured. Second, if the eggs are dipped promptly after they are laid in order to obtain the benefit of the low pH during storage, the jelly-like white of the egg becomes slightly cloudy. This effect is apparently due to the maintaining of the whites of the egg at a relatively low pH condition. Such cloudiness is found in oil dipped eggs which are dipped before the carbon dioxide escapes and while it is present in eggs that are not oil dipped but which are maintained in a carbon dioxide atmosphere which holds the pH at 7.6 or lower, such cloudiness and white in such latter eggs kept in a $CO_2$ atmosphere can be made to disappear if after the eggs are stored in the carbon dioxide atmosphere, they are placed in a ventilated room for a few days and the carbon dioxide is allowed to escape from the eggs thus causing the pH to rise to a point where this cloudiness disappears. With oil dipped eggs on the contrary no reasonable amount of ventilation can dissipate this cloudiness effect.

In order to retard the loss of water from the egg to the air it is preferable that proper relatively high humidity conditions be maintained in the storage rooms or storage or shipping containers.

The yolk of an egg when fresh, has a pH of about 6.0, that is, it is slightly acid. When the egg is stored in air, it loses carbon dioxide to the white and the white in turn loses it to the air and the pH of the yolk increases until it reaches a pH of about 6.8. The yolk, however, changes in pH more slowly than does the white. If the egg is maintained in an atmosphere so that the white is held in pH 7.6 then the yolk is also held near pH 6.0; thus the pH of both the white and the yolk can be maintained at the same value they had when the egg was freshly laid by storing the eggs in a proper concentration of carbon dioxide.

Some of the advantages herein enumerated and which have been set forth in connection with my preferred method may be obtained by placing freshly laid eggs in a carbon dioxide tight container and utilizing the carbon dioxide which is evolved from the eggs themselves to bring about an equilibrium condition. Such method obviously, while preventing excessively high pH conditions being reached will not keep the pH as low as with the preferred method wherein carbon dioxide is initially present in the storage atmosphere. The above modified method of procedure will, however, obtain some beneficial results in egg storage.

In carrying out the method of preservation, the use of various types of containers or storage rooms is contemplated. Small containers may be utilized in which relatively small numbers of eggs are packed. Provision should be made for introducing a quantity of carbon dioxide into such containers. Relatively bigger shipping containers can also be utilized for shipping eggs. The proportion of $CO_2$ should be coordinated to the temperature as above explained, that is, with higher temperatures the carbon dioxide content in the storage atmosphere should be higher. If desired, solid $CO_2$ can be utilized in the containers in which case, the solid $CO_2$ will not only serve as a refrigerant but it will also evolve $CO_2$ gas which will have its beneficial effect in preserving the eggs.

The carbon dioxide methods can also be used to advantage when oil dipping storage methods are employed. If eggs are received at the dipping plant with a relatively high pH condition they can be brought back to any desired pH condition by subjecting them for a time to the action of a $CO_2$ containing atmosphere of sufficient concentration to bring the eggs back to a desired pH condition. They can then be oil dipped to substantially maintain this pH condition.

It will be understood that while it is of course desirable to have carbon dioxide tight storage rooms or containers, such a condition is not essential in the event that provision is made for supplying additional carbon dioxide to the containers or storage rooms as the carbon dioxide escapes. Carbon dioxide may be derived from any desired source. It can be obtained from steel cylinders where it is stored under pressure or it can be obtained in various other manners known in the art.

Summarizing, the quality of eggs in storage and storage periods may be improved and extended over what is now obtainable by utilized carbon dioxide in the storage atmosphere. The containers or storage vessels may be large or small, they may be small or large shipping containers, or the storage vessels may be storage rooms of warehouses, refrigerator cars, ships or the like. Whatever type of storage vessel be employed provision should be made for the introduction of or maintaining of sufficient concentration of $CO_2$ to effect the desired results taking into account temperature conditions and using a greater concentration of $CO_2$ at higher temperatures than with lower storage temperatures. In the event of substantial leakage of $CO_2$ a make up preferably should be employed to make up the deficiency of the gas. With tight vessels no make up would be ordinarily required except for that taken up by the eggs and this may be taken care of by initially introducing a slight initial excess of $CO_2$. An initial excess of $CO_2$ could also be used in the event of the eggs being received for storage or for oil dipping with a relative high initial pH condition. After storage in a $CO_2$ containing atmosphere the cloudiness condition may be dissipated if desired by ventilating or allowing the eggs to stand in normal air for a short period. Such ventilation would ordinarily occur during the period which elapses between removal of the eggs from storage and their sale to the consumer. Excessive amounts of $CO_2$ should be avoided due to increasing the cloudiness condition and because of initial cost. Concentrations over 60% by volume are of no additional value over that obtainable with concentrations below and up to 60% by volume. Substantially all the desired effects upon the pH and the desired equilibrium conditions can be obtained by working with concentrations at 60% or materially below this point. Concentrations greater than 60% do not increase the preserving effects sufficiently to warrant the increased cost of such a practice. In practice concentrations materially lower than 60% by volume can be used with beneficial results as above set forth and obviously with greater economy.

I am aware that it has been proposed heretofore to subject eggs for sterilizing purposes to carbon dioxide which in concentrations runs over 90% with supplementary nitrogen as the other constituent of the surrounding medium. In such methods air or oxygen is entirely excluded. According to the present method the presence of air or oxygen is wholly immaterial and no such sterilizing effect is sought for or obtained.

What I claim is:

1. The method of preserving eggs which comprises preserving the eggs by maintaining the same in an atmosphere containing carbon dioxide of sufficient concentration to maintain the pH of the white of the egg at substantially 7.6 even if continued for a period of several months.

2. The method of preserving eggs which comprises subjecting them to the action of carbon dioxide mixed with air with such concentration of carbon dioxide, not over 60% by volume, as to maintain the whites thereof in a slightly alkaline condition which in degree corresponds substantially to that of a fresh egg.

3. The method of preserving and storing eggs which comprises effecting egg storage in a carbon dioxide containing air atmosphere containing sufficient concentration of carbon dioxide and not over 60% by volume to initially bring the eggs back to substantially normal fresh condition and in thereafter maintaining about the eggs a sufficient concentration of carbon dioxide to decrease the rate of subsequent deterioration.

4. In storage of eggs, the herein described steps which consist of bringing the hydrogen ion concentration of the white of the eggs, in the shell, to a pH value of about 7.6, and maintaining the same at about said value for a period of several months.

5. In storage of eggs, the method of preservation which consists in bringing the hydrogen ion concentration of the white of the eggs in the shell, to a pH value substantially within the range of that of a day old egg, during the period of preservation.

PAUL F. SHARP.